J. B. VICTOR.
GASKET.
APPLICATION FILED NOV. 23, 1916.
1,241,587.
Patented Oct. 2, 1917.
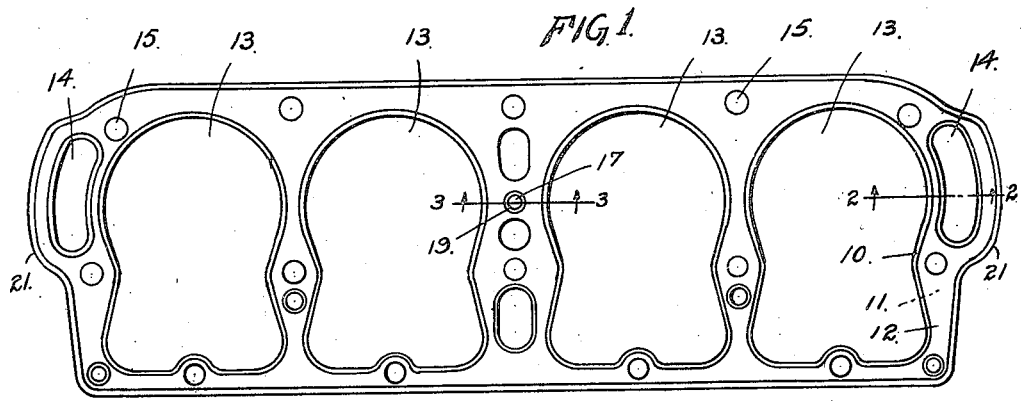
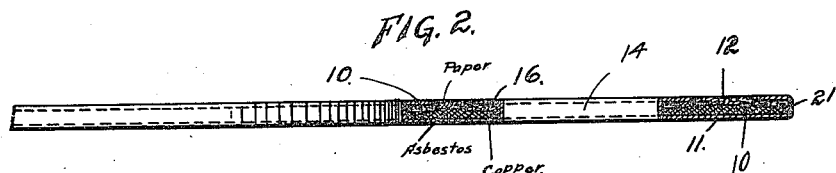
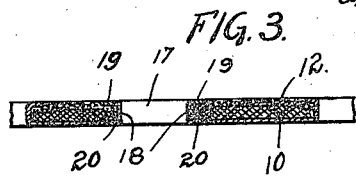
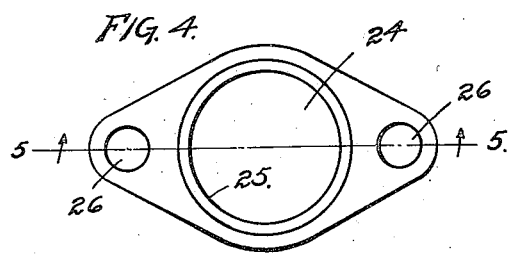
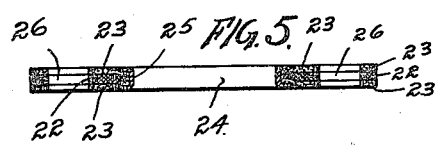
INVENTOR
Joseph B. Victor
BY
Barnett Truman
ATTORNEYS

UNITED STATES PATENT OFFICE.

JOSEPH B. VICTOR, OF CHICAGO, ILLINOIS, ASSIGNOR TO VICTOR MANUFACTURING & GASKET CO., OF CHICAGO, ILLINOIS, A CORPORATION OF ILLINOIS.

GASKET.

1,241,587.  Specification of Letters Patent.  Patented Oct. 2, 1917.

Application filed November 23, 1916. Serial No. 133,022.

*To all whom it may concern:*

Be it known that I, JOSEPH B. VICTOR, a citizen of the United States, residing at Chicago, in the county of Cook and State of Illinois, have invented certain new and useful Improvements in Gaskets, of which the following is a specification.

My invention relates to the manufacture of gaskets, more especially gaskets for use in connection with internal combustion engines, or in other situations where it is desirable to employ a gasket, which will not be injuriously affected by heat or contact with oil, water, or other liquid, for sealing a joint which is required to hold pressure.

The principal object of the invention is to provide a gasket having these requisites which can be produced at a relatively small cost.

A further, more specific, object of the invention is to provide a novel gasket for use between the cylinders and cylinder heads of an internal combustion engine.

The invention is illustrated, in certain typical embodiments, in the accompanying drawing wherein—

Figure 1 shows the upper face of a gasket suitable for use in a four-cylinder engine, of the cast *en bloc* type, between the cylinder block and the removable head.

Fig. 2 is a fragmentary cross sectional view, on an enlarged scale, taken on line 2—2 of Fig. 1, the thickness of the gasket being considerably exaggerated for the purpose of clearness of illustration.

Fig. 3 is a view similar to Fig. 2, taken on line 3—3 of Fig. 1.

Fig. 4 illustrates a modification of the invention, the gasket illustrated being of the type used between the manifold and the cylinder block, and Fig. 5 is a cross sectional view, the thickness of the gasket being again exaggerated, taken on line 5—5 of Fig. 4.

Like characters of reference designate like parts in the several figures of the drawing.

Referring now to Figs. 1, 2 and 3, the gasket illustrated in these figures consists of three elements, namely, a sheet of fibrous, compressible material, preferably asbestos mill board, which is designated 10 in the drawing, an under facing 11 of metal, preferably copper, and an upper facing 12 of paper, preferably a heat resisting, relatively non-absorbent Manila paper or cardboard. The faces of these three elements of the gasket are of the same general size and shape and are formed with sets of substantially coincident openings. In a gasket for a four-cylinder engine, such as is shown in Fig. 1, the structure will have four large openings 13 to correspond with the openings in the cylinder block. It will also be provided with openings 14 to correspond to the water passages in the cylinder block and head, together with such other perforations, such as holes 15 for the bolts attaching the head to the cylinder block, as the construction of the engine for which the gasket is designed may require.

The advantage of using paper for the upper facing of the gasket is, in the first place, the cheapness of the material, in comparison with metal, for example, and, in the second place, the fact that paper is to a certain extent compressible so that the gasket when faced on one side with paper will make a tighter joint than a composite gasket metal faced on both sides. It is necessary, however, to protect the edges of the paper facing, at least certain of these edges, for example, those which would otherwise be subject to contact with flames or with oil or water. I accomplish the desired result by providing some or all of the edges of the gasket with a metal beading which extends around the edges of the sheet of asbestos and overlaps the corresponding marginal portions of the paper facing. In a gasket of the general type shown in Figs. 1, 2 and 3 it is desirable, for convenience of manufacture, to form this beading integral with the lower metal face 11; although the bead may be a separate element in case particularly of some of the smaller openings.

As shown in Fig. 2, the edge of the copper facing defining one of the openings 13 is formed with an inturned bead 16 which overlaps the corresponding marginal portion of the upper paper facing 12. This bead is struck out from the copper sheet as a flange and then pressed down upon the paper facing when the elements of the gasket have been superposed one upon the other. These operations may be performed by means of any suitable dies and presses.

Fig. 3 shows one of the smaller openings of the gasket, designated 17, which is beaded by means of a separate annular member 18 having flanges 19 and 20 which are pressed against the upper and lower facings, respectively. Preferably the outer edge of the copper facing is formed with an integral bead 21 which overlaps the outer marginal portion of the upper facing.

The beading of the edges of the gasket, as above described, besides protecting the edges of the asbestos and paper sheets and keeping them from contact with oil or water, as the case may be, provides a simple and effective means for securing the elements of the gasket together to form a unitary structure which, despite its thinness and the fragility of its elements can be handled without danger of its breaking or being otherwise injured.

The simplified form of gasket shown in Figs. 4 and 5 consists of a sheet of asbestos, or other compressible, fibrous material 22 and two paper facings 23, these elements being united and their coincident edges defining the central opening 24 in the gasket being protected by means of an annular metal bead 25. 26 are the bolt holes which ordinarily will not require protection.

While I have described my invention as embodied in certain typical embodiments, it will be understood that the invention is not confined to the shape of the gasket or to the number and arrangement of the openings therein, these matters of design depending, of course, upon the place in which the gasket is used.

I claim:

1. A gasket composed of a sheet of fibrous, compressible material and facings on opposite sides of said sheet, one of which consists of relatively non-absorbent, heat-resisting paper, and the aforesaid three elements of the gasket provided with a metal beading inclosing the edge of the sheet of fibrous material, overlapping the corresponding marginal portion of said paper facing, and securing said elements together so as to form thereof a unitary structure.

2. A gasket composed of a sheet of fibrous, compressible material and facings on opposite sides of said sheet, one of which consists of relatively non-absorbent, heat-resisting paper, and the aforesaid three elements of the gasket being formed with substantially coincident openings and being provided with a metal beading inclosing the edge of said sheet of fibrous material around said opening, overlapping the corresponding marginal portion of the paper facing, and uniting said elements together to form thereof a unitary structure.

3. A gasket composed of a sheet of fibrous, compressible material and facings on opposite sides of said sheet, one of which consists of relatively non-absorbent, heat-resisting paper and the other being of metal, the aforesaid three elements of the gasket provided with a metal beading inclosing the edge of the sheet of fibrous material, overlapping the corresponding marginal portion of said paper facing, and securing said elements together so as to form thereof a unitary structure.

4. A gasket composed of a sheet of fibrous, compressible material and facings on opposite sides of said sheet, one of which consists of relatively non-absorbent, heat-resisting paper and the other being of metal, the two first mentioned elements of the gasket having coincident edges and the metal facing being formed with an inturned beading which extends around the edge of the sheet of fibrous material, overlaps the corresponding marginal portion of the paper facing and secures said elements together to form thereof a unitary structure.

5. A gasket composed of a sheet of fibrous, compressible material and facings on opposite sides of said sheet, one of which consists of relatively non-absorbent, heat-resisting paper, and the other being of metal; the two first mentioned elements being formed with coincident openings and the metal facing being formed around the opening therein with an inturned beading which incloses the edge of the sheet of fibrous material and overlaps the corresponding marginal portion of the paper facing.

6. A gasket composed of a sheet of fibrous, compressible material and facings on opposite sides of said sheet, one of which consists of relatively non-absorbent, heat-resisting paper, and the other being of metal; the aforesaid three elements being formed with substantially coincident openings and being provided with a metal beading inclosing the edge of said sheet of fibrous material around said opening, overlapping the corresponding marginal portion of the paper facing, and uniting said elements together to form thereof a unitary structure.

7. A gasket composed of a sheet of fibrous, compressible material and facings on opposite sides of said sheet, one of which consists of relatively non-absorbent, heat-resisting paper and the aforesaid three elements of the gasket having substantially coincident openings, the edges defining said openings being provided with a metal beading inclosing the edges of said sheet of fibrous material, overlapping the corresponding marginal portions of said paper facing, and securing said elements together to form thereof a unitary structure.

8. A gasket composed of a sheet of fibrous, compressible material and facings on opposite sides of said sheet, one of which consists of relatively non-absorbent, heat-resisting paper, and the other being of metal; the aforesaid three elements of the gasket having substantially coincident openings, the edges defining said openings being provided with a metal beading inclosing the edges of said sheet of fibrous material, overlapping the corresponding marginal portions of said paper facing, and securing said elements together to form thereof a unitary structure.

9. A gasket composed of a sheet of fibrous, compressible material and facings on opposite sides of said sheet, one of which consists of relatively non-absorbent, heat-resisting paper, and the other being of metal; the two first mentioned elements being formed with coincident outer edges and openings, and the metal facing being formed with a beading along its inner and outer edges which overlaps the corresponding marginal portions of the paper facing and secures said elements together to form thereof a unitary structure.

10. A gasket composed of a sheet of asbestos mill board, a facing of copper on one side of the asbestos and a facing of relatively non-absorbent, heat-resisting paper on the other side thereof; the aforesaid three elements of the gasket provided with a metal beading which incloses the edge of the asbestos, overlaps the corresponding marginal portion of the paper facing and secures said elements together to form thereof a unitary structure.

11. A gasket composed of a sheet of asbestos mill board, a facing of copper on one side of the asbestos and a facing of relatively non-absorbent, heat-resisting paper on the other side thereof, the asbestos and paper elements of the gasket having substantially coincident edges and the edge of said metal facing being formed to provide a bead which incloses the edge of the asbestos and overlaps the corresponding marginal portion of the paper facing.

12. A gasket composed of a sheet of asbestos mill board and facings on opposite sides of said sheet, one of which consists of relatively non-absorbent, heat-resisting paper, and the other being of copper; the two first mentioned elements being formed with coincident outer edges and openings, and the copper facing being formed with a beading along its inner and outer edges which overlap the corresponding marginal portions of the paper facing and secures said elements together to form thereof a unitary structure.

13. A gasket adapted to pack the joint between the cylinder block and head block of an internal combustion engine, comprising a sheet of metal, a sheet of asbestos and a sheet of relatively non-absorbent heat-resisting paper superposed one upon the other in that order, said elements being formed with a plurality of openings provided with a metal beading which unites said elements and overlaps the marginal portions of the paper element.

14. A gasket adapted to pack the joint between the cylinder block and head block of an internal combustion engine comprising a sheet of metal, a sheet of asbestos and a sheet of relatively non-absorbent, heat-resisting paper superposed one upon the other in that order, said elements being formed with a plurality of openings and the metal sheet being formed so as to provide a beading around said openings which serves to unite said elements and which overlaps the marginal portions of the paper element so as to protect the same and the edges of the asbestos sheet.

15. A gasket adapted to pack the joint between the cylinder block and head block of an internal combustion engine comprising a sheet of metal, a sheet of asbestos and a sheet of relatively non-absorbent, heat-resisting paper superposed one upon the other in that order, said elements being formed with a plurality of openings and the metal sheet being formed so as to provide a beading around said openings and around the outer edge of the gasket which serves to unite said elements and which overlaps the marginal portions of the paper element so as to protect the same and the edges of the asbestos sheet.

JOSEPH B. VICTOR.